Figure 1:
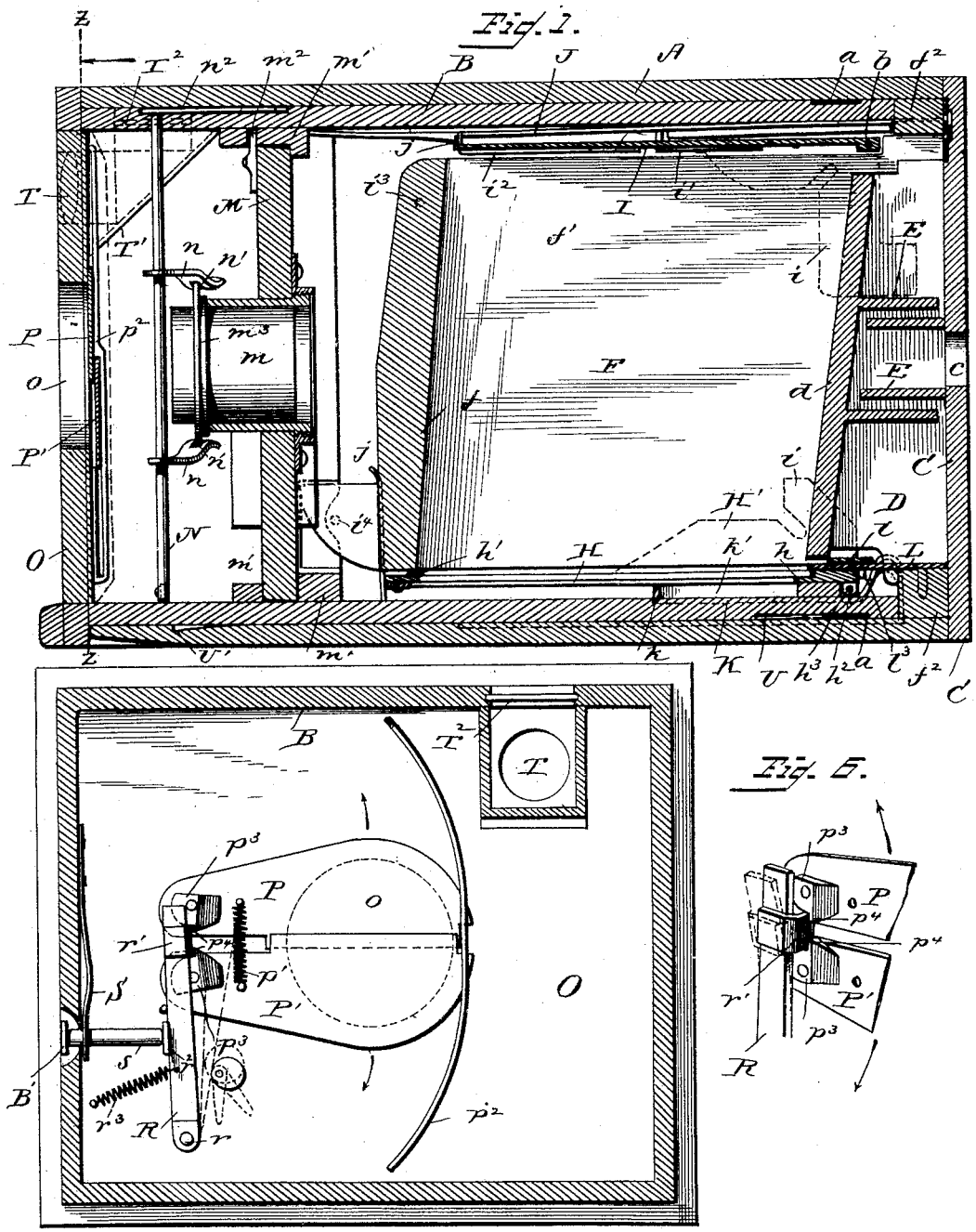

(No Model.) 4 Sheets—Sheet 2.
F. BURROWS.
PHOTOGRAPHIC CAMERA.

No. 463,284. Patented Nov. 17, 1891.

Witnesses
Wm. ?
E. E. Hart

Inventor
Francis Burrows
By his Attorney
Franklin H. Hough (No Model.) 4 Sheets—Sheet 3.
F. BURROWS.
PHOTOGRAPHIC CAMERA.
No. 463,284. Patented Nov. 17, 1891.
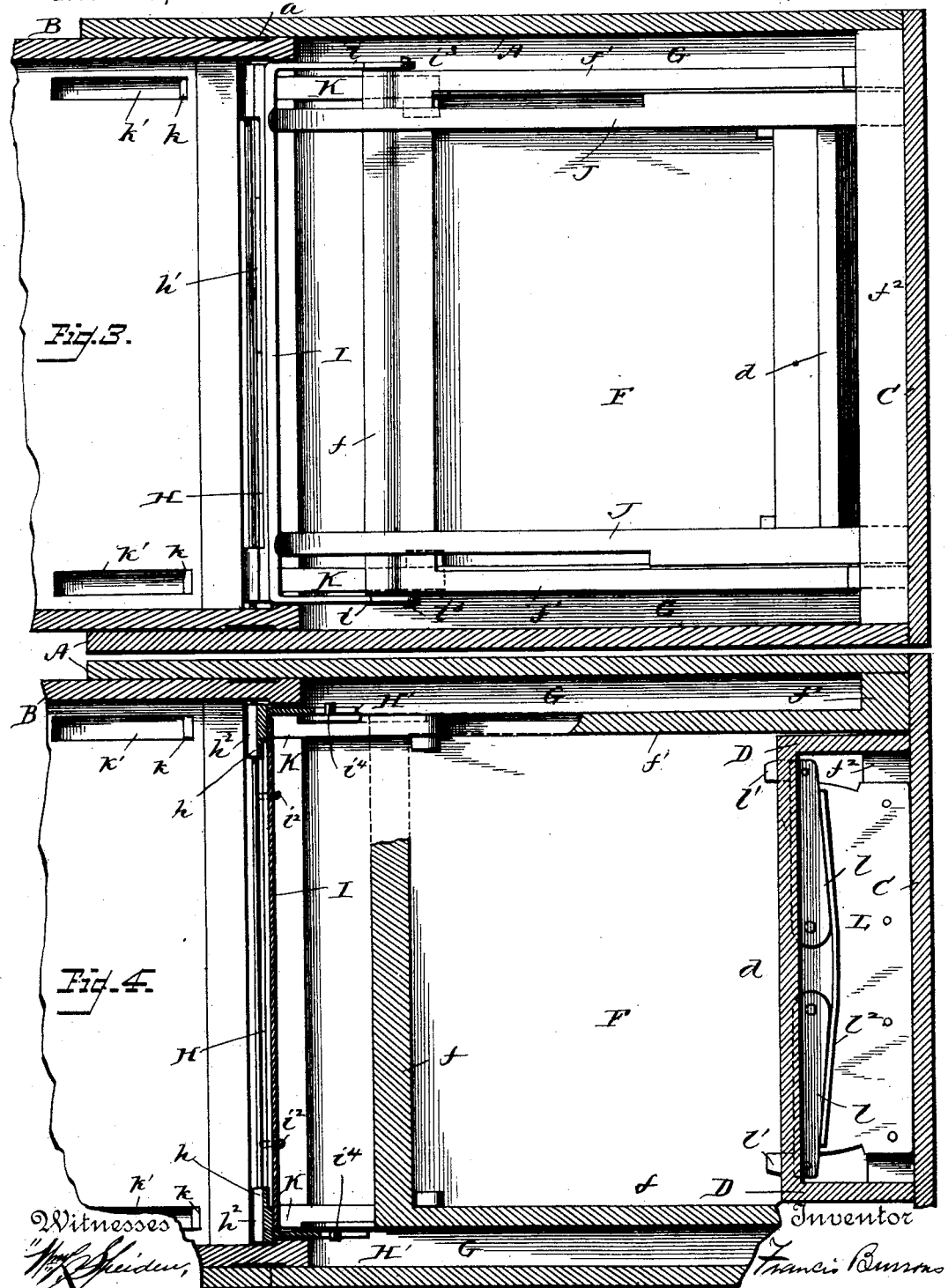
Witnesses
Inventor
Francis Burrows
By his Attorney (No Model.) 4 Sheets—Sheet 4.
F. BURROWS.
PHOTOGRAPHIC CAMERA.
No. 463,284. Patented Nov. 17, 1891.
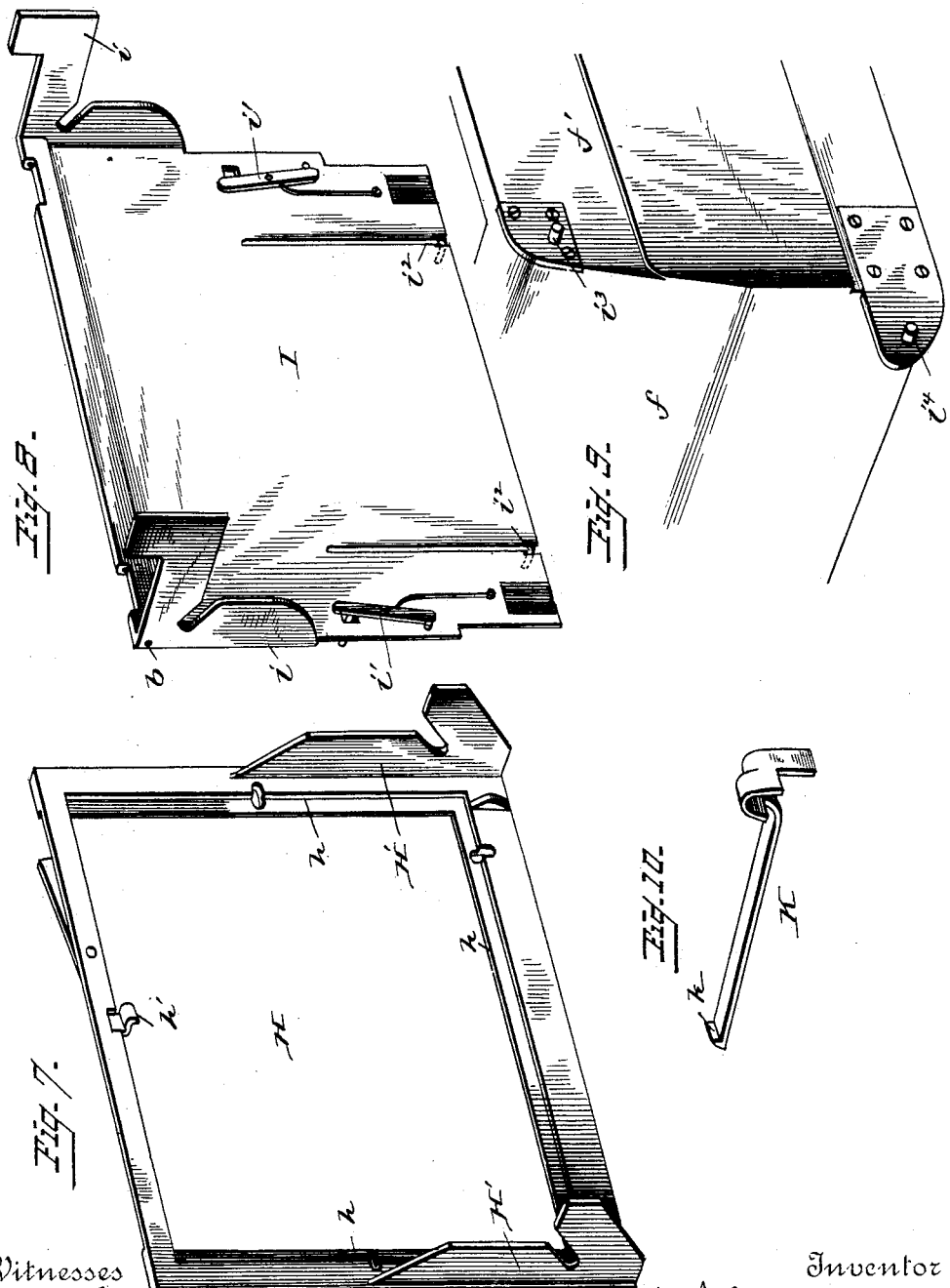

UNITED STATES PATENT OFFICE.

FRANCIS BURROWS, OF PHILADELPHIA, PENNSYLVANIA.

PHOTOGRAPHIC CAMERA.

SPECIFICATION forming part of Letters Patent No. 463,284, dated November 17, 1891.

Application filed December 16, 1890. Serial No. 374,900. (No model.)

*To all whom it may concern:*

Be it known that I, FRANCIS BURROWS, a citizen of the United States, residing at Philadelphia, in the county of Philadelphia and State of Pennsylvania, have invented certain new and useful Improvements in Photographic Cameras; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in photographic cameras, and it has more particular reference to that class of cameres which are known as "detective" or "hand" cameras of the magazine type.

The invention has for its object, among others, to provide a camera of this character, within which may be stored in readiness for use a quantity of plates or an equal number of film-carriers.

A further object of the invention is to provide, in connection with the camera, mechanism for transferring the plates or film-carriers in rotation from the magazine or storage chamber to the proper position for exposure, and after the exposure has been made to return them again to the magazine.

The invention has for a further object to provide a photographic-magazine camera which will be much more compact and will furnish storage capacity for a greater number of plates or film-carriers than in cameras of this character which have heretofore been constructed.

Finally, the invention has for a further object to so construct a magazine-camera as to render its operation simple and efficient and its manipulation possible by persons who are unskilled in the art of photography. It will be observed that the magazine or storage chamber of the camera when not in use occupies the space that is required in adjusting the focus of the lens when the instrument is in use.

To the above ends, and to such others as the invention may pertain, the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 2:
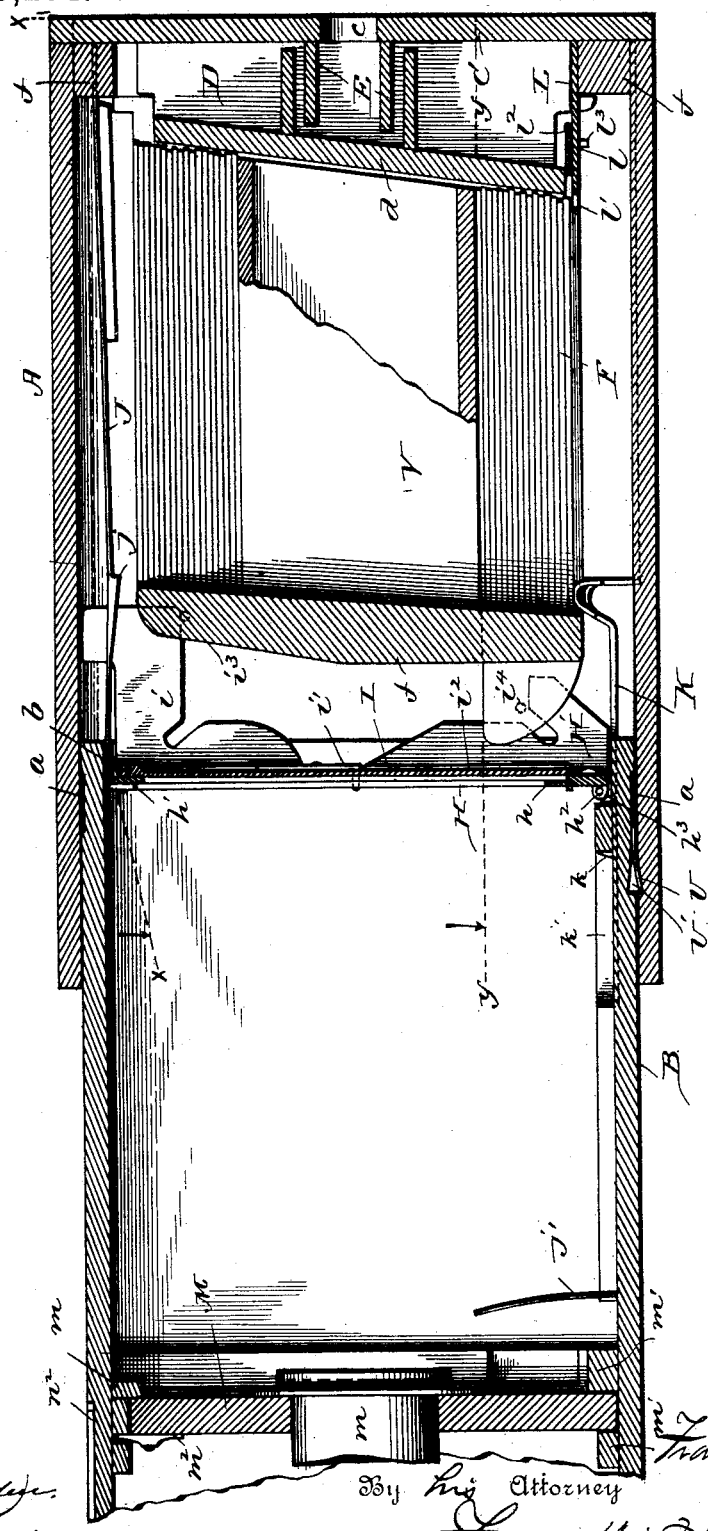

Figure 1 is a longitudinal sectional view of my improved magazine-camera, showing the positions assumed by the several parts when not in operation. Fig. 2 is a similar view showing the camera extended and the plate in position for exposure. Fig. 3 is a horizontal sectional view taken upon the line $x\ x$ of Fig. 2. Fig. 4 is a similar view taken upon the line $y\ y$ of Fig. 2. Fig. 5 is a transverse sectional view taken on the line $z\ z$ of Fig. 1, showing the shutter and its operating mechanism. Fig. 6 is a detail perspective view of a portion of the shutter-operating mechanism. Fig. 7 is a perspective view of the lower plateholder. Fig. 8 is a similar view of the upper plate-holder. Fig. 9 is a detail perspective view showing the tripping-pins for raising the plate-holders into position. Fig. 10 is a perspective view of one of the plate-supports.

Reference now being had to the details of the drawings by letter, A designates the outer casing of the camera, consisting of a rectangular box open at its front end for the inner casing B. These two portions of the case are arranged to telescope one within the other, suitable packing $a$ being interposed for the exclusion of light. The rear portion of the casing A is closed by a removable back C, provided with openings $c$ for the admission of air, and within the casing a short distance from the back C and connected thereto by side walls D is provided a false back $d$. Short partitions E project alternately from the backs C and $d$, reaching nearly to the opposite side, thus freely admitting the air while excluding the light. The back $d$ forms one end of the magazine-chamber F, and by being removed affords ready access to said chamber for the purpose of refilling.

The magazine-chamber is composed of the front portion $f$ and side portions $f'$, which extend backward and are secured to cleats $f^2$ on the inside of the outer casing A, thereby leaving a space G between said casing and the partitions $f'$, as shown in Figs. 3 and 4. It will thus be seen that the inner casing B and its attachments may be drawn out from around the magazine F, as is clearly shown in Fig. 2.

In practice the plates are piled horizontally in the magazine F, the one upon the bottom of the pile resting in the lower plate-holder H when the camera is closed. The lower plate-holder H is a rectangular frame provided on three of its sides with flanges $h$, in which the plate rests, while the front side is provided with a spring-latch $h'$, which serves to hold the plate firmly in position while being raised into position for exposure. This plate-holder is further provided at each side with a projecting ear H', approximately L-shaped, the purpose of which will hereinafter appear, and with two lugs $h^2$ on its under side, by which it is pivoted near the bottom of the casing B at $h^3$.

I designates the upper plate-holder pivoted near the top of the casing B at $b$. This plate-holder is made of sheet metal or other thin material, and is provided at its sides with L-shaped ears $i$, to be hereinafter described. It is further provided near its edges with spring-latches $i'$, which serve to hold the plate firmly in position against the holder, and two spring-supports $i^2$ to prevent the plate from sliding out when brought to a vertical position. When the camera is closed, the upper plate-holder I lies along the top of the magazine F. When, however, the camera is drawn out for use, the ears $i$ on the upper plate-holder engage the tripping-pins $i^3$ near the forward ends of the magazine F, thereby swinging the plate-carrier I down into a vertical position in front of the partition $f$. The same movement slides the lower plate-holder forward with the bottom plate of the series resting within the flanges. When the ears H' come into contact with the tripping-pins $i^4$ on the sides of the magazine, the plate-carrier H is elevated to a vertical position against the upper plate-holder I, thus holding the plate securely in position for an exposure, as shown in Fig. 2 of the drawings. After the exposure has been made the casing B is again pushed in and the plate-holders H and I assume their original horizontal positions. In this return movement the plate just exposed, being held firmly against the holder I by means of the latches $i'$, is carried to the top of the magazine-chamber F, where it is held until the casing B is again drawn out. When the camera is again extended, the forward ends of the plate come into contact with the stops $j$ on a pair of retaining-springs J, thereby holding the plate in position above the magazine chamber, while the plate-holder I, passing from under the plate, deposits it upon the top of the pile.

In order that the latch $h'$ may not interfere with the placing and withdrawing of the plate from the lower plate-holder, a flat spring projects vertically from the bottom of the casing B in such a position that the arm of the latch $h'$ comes into contact with it when the plate-holder H is in a horizontal position, thus drawing the latch $h'$ into a recess formed for its reception in the edge of the plate-holder. When the plate-holder H assumes a vertical position, said latch is drawn in by its arm coming in contact with the top of the casing B.

When the lower plate-holder H containing the plate is withdrawn from the bottom of the pile, it is necessary to afford some support for said pile, and this is accomplished in the following manner: Two flat strips K, preferably of metal, are made to slide freely in grooves formed in the bottom of the casing B near its rear end. When the camera is closed, as shown in Fig. 1, these strips lie close in the grooves; but when the casing B is drawn out they drop backward until the stops $k$ at their forward ends come to the end of the grooves $k'$. When in this position, the rear ends of the strips K, which are bent upward to project a short distance into the magazine, afford a support for the front end of the pile, as shown in Fig. 2.

To the cleat $f^2$ on the bottom of the casing A, near its rear edge, is secured a plate L, projecting forward in a plane with the bottom of the magazine F, to the upper surface of which are pivoted two arms $l$, Fig. 4, extending in opposite directions toward the sides of the casing. These arms $l$ are provided at their outer ends with projecting lugs $l'$, which extend beyond the edge of the magazine when the arms $l$ are pressed forward by the action of the spring $l^2$, thus affording a support for the rear end of the pile when the lower plate-holder is withdrawn. When the lower plate-holder returns to its position under the magazine, its rear edge comes in contact with pins $l^3$, projecting downward from the ends of the arms $l$, thus forcing them back and allowing the next plate to drop into the holder.

Near the forward end of the inner casing B is secured the partition M, carrying the lens $m$. This partition is held between cleats $m'$ by a turn-button $m^2$, which permits its withdrawal when necessary.

Slightly in advance of the partition M is the focusing mechanism, consisting of a vertical rod N, fitting over a stud in the bottom of the case and passing through the top thereof. This rod is provided near its center with two laterally-projecting arms $n$, provided with short slots $n'$ at their outer ends to embrace the flange $m^3$ of the lens $m$. It will thus be seen that by turning the rod the lens may be brought to any desired focus. The rod N is provided at its upper end with a spring $n^2$, lying flush with the surface of the casing B, said finger moving on a scale which is so marked as to indicate the focus for objects of a given distance.

The front of the camera is provided with a door O, in the center of which is the aperture o, closed by the shutter P, now to be described.

The shutter P is composed of two levers P and P', pivoted at one side of the aperture o when brought together by the action of the spring p', a guide p² being provided in the path described by their outer ends to insure close contact with the face of the door O. The leaves P and P' are provided near their pivotal points with lugs p³, formed with a tooth-like projection p⁴ on their adjacent edges and inclined surfaces in the direction of the main body of the leaves. R is a lever pivoted at r and provided near its upper end with an offset r', said offset normally resting between the lugs p³ just in the rear of the projections p⁴. A flat spring S is secured to the side of the casing B, supporting at its free end the push-button B', said push-button lying flush with the outer surface of the casing and its shank s extending through contacts with an offset r² near the center of the lever R. It will thus be seen that when the button B' is pressed the lever R is pushed forward. Its offset r', coming in contact with projections p⁴ of lugs p³, forces the leaves of the shutter apart, and passing on allows them to instantly return by the action of the spring p'. As the lever returns to its normal position by the action of the spring r³, its offset r' rides up over the inclined faces of the lugs p³ and drops back into position behind the projections p⁴, as is clearly shown in Fig. 6, without causing any movement of the shutter.

In the front portion of the camera, at any convenient point, is inserted a lens T, behind which is arranged a mirror T' at an angle of forty-five degrees. The image of the object to be photographed is thus projected against a piece of ground glass T² or any other semi-transparent material inserted in the top of the casing, enabling the operator to survey the field of his picture before exposing.

In order that the casings A and B may not be accidentally slipped apart, the inner casing B is provided with a spring-catch U, which drops into a recess U' in the casing A when the camera is extended to its full length.

The magazine may be either entirely or partly filled with plates or film-carriers. It is, however, necessary that the pile should extend to the top of the magazine to prevent the plates from falling the intervening distance, which might result in breakage. When, therefore, a small number of plates are used, as illustrated in Fig. 2, the intermediate space is filled by a hollow box or block V, whose top and bottom faces are of a size corresponding to that of the plates and of a thickness equal to the space required to be filled.

The operation will be readily understood from the foregoing description. By drawing out the camera to its full length the lower plate-holder containing the bottom plate of the pile is elevated to a vertical position by means of its ears coming in contact with the pins on the forward end of the magazine. The upper plate-holder having previously descended by the action of its ears on the upper pins the plate is held between the two plate-holders. The lens is now focused by means of the lever n², through the medium of the rod N and arms n. The button is pressed, which operates the shutter, as before described, thus giving an instantaneous exposure. The camera is then pushed together, which action causes the plate-holders to assume their horizontal position, the plate being carried by the upper holder to the top of the pile, upon which it is deposited by the action of the retaining-springs J, when the upper plate-holder again moves forward.

Having thus described my invention, what I claim to be new, and desire to secure by Letters Patent, is—

1. The combination, with the casing composed of telescoping sections which have a close joint between them, the end wall of the outer casing having an opening for the admission of air and provided with a false back a short distance from the said apertured end, of short partitions projected alternately from the false back and the said apertured end, substantially as and for the purpose set forth.

2. The combination, with the case composed of telescoping sections and a magazine in one of the sections to receive the plates, of a plate-holder to receive the plates from the bottom of the pile and bring the same into proper position for receiving the picture and a second plate-holder to receive the plate and carry the same to the top of the pile, both being connected with and operated by the telescoping section, substantially as set forth.

3. The combination, with the case composed of telescoping sections and a plate-magazine, of a plate-holder connected with the telescoping section and a trip to tilt the plate-holder and bring it into proper position, substantially as described, and for the purpose specified.

4. The combination, with the case composed of telescoping sections and a plate-magazine, of the plate-holder having ears and flanges and having a catch to retain the plate in position in the plate-holder and a trip to engage with the said ears and bring the plate into proper position to receive the picture, substantially as described.

5. The combination, with the case composed of telescoping sections and a magazine to receive the plates, of a plate-holder connected with and operated by the telescoping section, and catches i' on the plate-holder to retain the plates in position, and supports, as i², substantially as and for the purpose specified.

6. The combination, with the case composed of telescoping sections and the magazine, of the lower plate-holder constructed to support the plates from below and the plates K and L for retaining the plates in the magazine when the plate-holder is withdrawn, substantially as set forth.

7. The combination, with the case composed of telescoping sections and the magazine, of the lower plate-holder, the support K, having a limited movement relative to the telescoping section, substantially as described, and for the purpose specified.

8. The combination, with the telescoping sections and the plate-holder having the spring-catch $h'$, of the spring $j'$, projected up from the bottom of the telescoping section to engage with the catch $h'$, substantially as and for the purpose described.

9. The combination, with the case having an opening, of the shutter composed of two leaves, each having a lug $p^3$, the lever R, pivoted as described and provided near its upper end with the offset $r'$, normally resting between the lugs $p^3$ and constructed to engage with the said lugs during a portion of its forward motion and pass by them and adapted to ride over the said lugs on its reverse movement, substantially as described.

In testimony whereof I affix my signature in presence of two witnesses.

FRANCIS BURROWS.

Witnesses
 ERNEST HOWARD HUNTER,
 JOHN A. BRAMLEY.